(12) United States Patent
Steahly

(10) Patent No.: US 10,012,288 B2
(45) Date of Patent: Jul. 3, 2018

(54) GLUE-ON ATTACHABLE FLYWHEEL WEIGHT

(71) Applicant: Charles Steahly, Medford, OR (US)

(72) Inventor: Charles Steahly, Medford, OR (US)

( * ) Notice: Subject to any disclaimer, the term of this patent is extended or adjusted under 35 U.S.C. 154(b) by 735 days.

(21) Appl. No.: 13/833,737

(22) Filed: Mar. 15, 2013

(65) Prior Publication Data

US 2013/0239744 A1 Sep. 19, 2013

Related U.S. Application Data

(60) Provisional application No. 61/611,998, filed on Mar. 16, 2012.

(51) Int. Cl.
*F16F 15/30* (2006.01)
*B32B 37/12* (2006.01)

(52) U.S. Cl.
CPC ............. *F16F 15/30* (2013.01); *B32B 37/12* (2013.01); *Y10T 74/2132* (2015.01); *Y10T 156/10* (2015.01)

(58) Field of Classification Search
CPC .. F16F 15/30; F16F 15/16; F16F 15/28; F16F 15/12; F16F 15/305; F16F 15/31; F16F 15/315; F16F 15/3153; F16F 15/328; F16F 15/322; F16F 2222/10; Y10T 74/2132; Y10T 74/2121; Y10T 74/2128; Y10T 74/2131; Y10T 156/10; B32B 37/12; B32B 37/1207; B32B 37/1246; B32B 37/24
See application file for complete search history.

(56) References Cited

U.S. PATENT DOCUMENTS

| | | | | |
|---|---|---|---|---|
| 4,889,011 A | * | 12/1989 | Steahly | F16F 15/315 74/572.2 |
| 4,977,794 A | * | 12/1990 | Metcalf | F16F 15/30 482/63 |
| 5,655,637 A | * | 8/1997 | Hays | F16D 13/71 188/264 A |
| 2009/0173183 A1 | * | 7/2009 | Chen | F16F 15/30 74/572.21 |
| 2010/0073316 A1 | * | 3/2010 | Nozawa | G06F 3/045 345/173 |
| 2012/0089180 A1 | * | 4/2012 | Fathi | B41J 2/17559 606/214 |
| 2012/0171413 A1 | * | 7/2012 | Fisk | B32B 3/06 428/131 |

* cited by examiner

*Primary Examiner* — Richard W Ridley
*Assistant Examiner* — Brian J McGovern
(74) *Attorney, Agent, or Firm* — Alleman Hall Creasman & Tuttle LLP

(57) ABSTRACT

A glue-on attachable flywheel weight adds rotational mass to a flywheel allowing for a vehicle operator to alter the power characteristics of an engine. Different flywheels require different shapes of attachable weights. The attachable weights can be machined to fit a multitude of different flywheels to add the rotational mass. Applying an adhesive secures the weight onto the flywheel and adds the rotational mass in a user-friendly convenient manner.

9 Claims, 8 Drawing Sheets

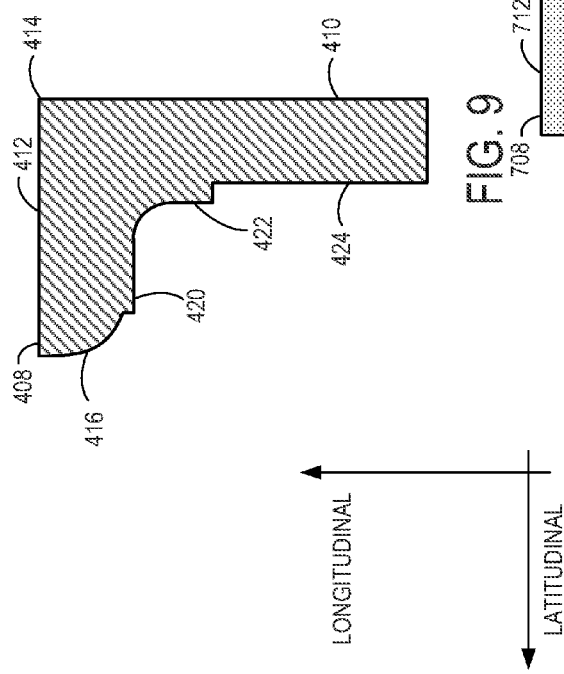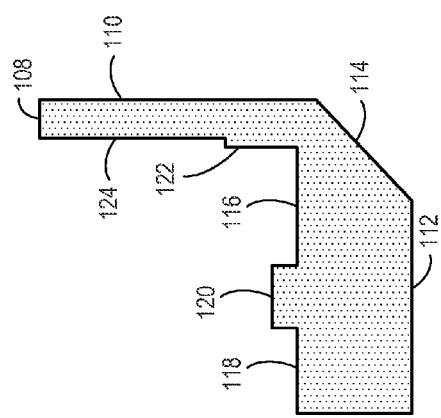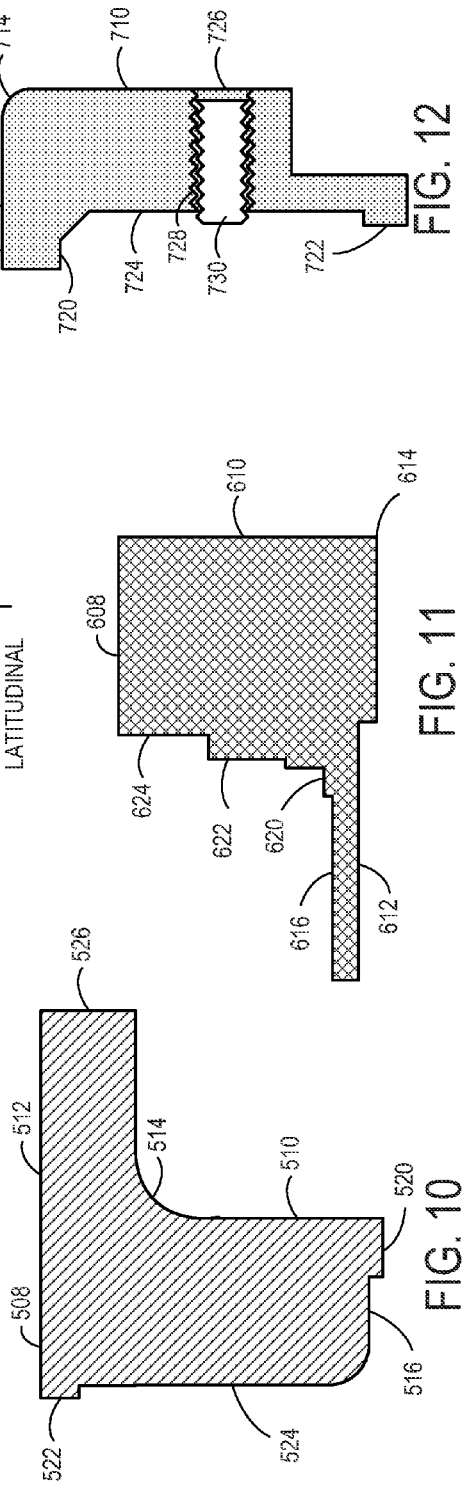

US 10,012,288 B2

GLUE-ON ATTACHABLE FLYWHEEL WEIGHT

CROSS REFERENCE TO RELATED APPLICATION

The present application claims priority to U.S. Provisional Patent Application No. 61/611,998, titled GLUE-ON ATTACHABLE FLYWHEEL WEIGHT, filed Mar. 16, 2012, the entire contents of which are incorporated herein by reference in their entirety for all purposes.

BACKGROUND

The power characteristics of an engine can be changed by increasing or decreasing the internal rotating mass, which may be commonly referred to as flywheel weight or flywheel inertia. Decreasing the flywheel inertia will cause the engine speed (RPMs) to increase at a quicker rate during acceleration conditions. Such increases in engine speed during acceleration conditions may make drivability or handling of a vehicle (e.g., a motorcycle) more difficult to control. Accordingly, during acceleration conditions, the rider must use more throttle control, concentration, strength, and energy to maintain traction and control of the vehicle.

Increasing the flywheel inertia will make the engine speed increase at a slower rate during acceleration conditions that may make vehicle acceleration easier to control. Since the engine speed increases at a slower rate, engine torque may be transferred to the vehicle's tires at a slower rate that makes the tires less likely to lose traction. Further, the rider has more time to make corrections. Moreover, the increased engine inertia, or engine momentum, may also keep the engine from stalling or dying out. Accordingly, the vehicle may travel at lower engine speeds with less of a possibility of the engine suddenly stalling. In other words, the increase in flywheel inertia allows a rider to "chug" at lower engine speeds with less of a possibility of the engine suddenly stalling.

Thus, for ease of control, some riders prefer to add more weight to their ignition flywheels. One prior approach that has been employed is to bolt on or screw on a steel disc to the existing ignition flywheel, while this approach is easily implemented by an amateur mechanic, it suffers from the drawback that sufficient space must be present within the flywheel case for clearance of the bolt or screw, and the bolt or screw may become loose over time, potentially leading to catastrophic failure at high engine speeds.

Other prior approaches include welding a steel ring to the existing ignition flywheel, pressing on an interference fit metal ring to the flywheel, adding heavy metal to the crankshaft, building a larger or heavier crankshaft, building a larger or heavier ignition flywheel, or building a clutch basket out of heavier material. While each of these approaches increases the rotational mass of the powertrain, most of these methods are too expensive or beyond the engineering capabilities of an amateur mechanic. Although the bolt on/screw on weight disc discussed above is within the technical ability of an amateur mechanic to install, this approach is becoming more difficult to implement because four stroke engines with increasingly compact configurations are becoming more popular in motorcycles as compared to two stroke engines. Since four stroke engines are generally larger, heavier, and have more parts than a two stroke engine of the same displacement, manufacturers are making the four stroke engines more compact, leaving less room to add flywheel weight in the ignition area. Four stroke engines generally have the ignition flywheel in the same oil cavity as the rest of the vital engine parts, so if a fastener comes out of a flywheel weight, damage to the engine can be extensive. In addition, ignition flywheels have generally changed in design, due in part to electronic fuel injection, making it much more difficult to attach a weight disc using fasteners.

For manufacturers of aftermarket flywheel weights, the challenge has been to find an inexpensive and easily implemented way to add more inertia to compact engine and ignition designs.

BRIEF DESCRIPTION OF THE DRAWINGS

FIG. 8 shows one side of a close-up cross-sectional view of the first embodiment of the glue-on attachable flywheel weight of FIG. 3.

FIG. 9 shows one side of a close-up cross-sectional view of the second embodiment of the glue-on attachable flywheel weight of FIG. 4.

FIG. 10 shows one side of a close-up cross-sectional view of the third embodiment of the glue-on attachable flywheel weight of FIG. 5.

FIG. 11 shows one side of a close-up cross-sectional view of the fourth embodiment of the glue-on attachable flywheel weight of FIG. 6.

FIG. 12 shows one side of a close-up cross-sectional view of the fifth embodiment of the glue-on attachable flywheel weight of FIG. 7.

DETAILED DESCRIPTION

The present description relates to methods and apparatuses for increasing a rotational mass or inertia of a flywheel of a vehicle engine. More particularly, the present description relates to a glue-on attachable flywheel weight and methods for attaching the glue-on attachable flywheel weight to a flywheel of a motorcycle engine. The glue-on attachable flywheel weight may have a small form factor that allows the weight to fit in a compact engine of a motorcycle. In some embodiments, the glue-on attachable flywheel weight may be attached to a flywheel without fasteners that may become loose over time. However, it is to be understood that, in some embodiments, the flywheel weight may be attached to a flywheel using a combination of adhesive and set screws. The glue-on attachable flywheel weight may provide an inexpensive solution for an amateur mechanic to install in order to increase flywheel inertia.

Figure 1:
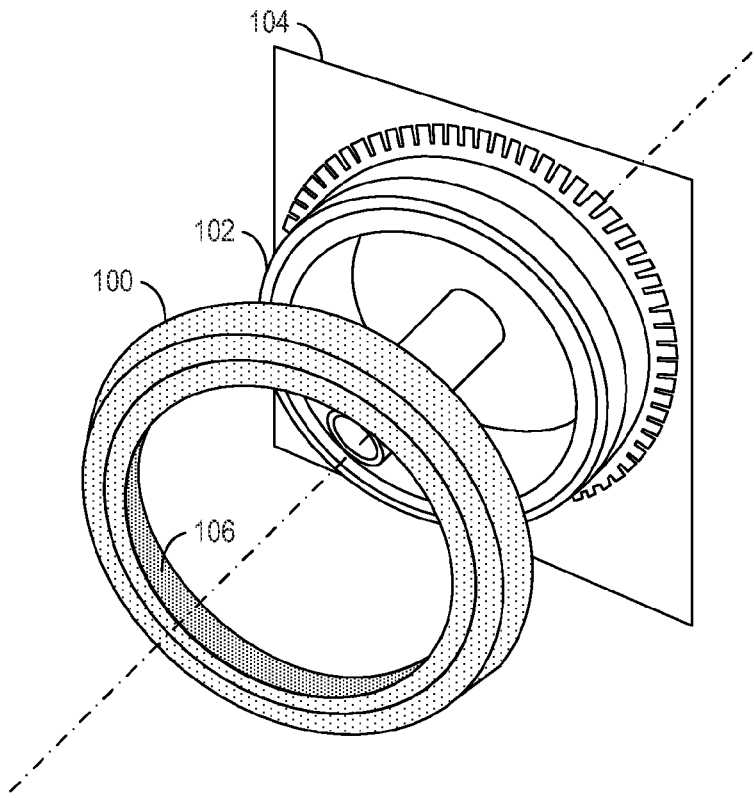
FIG. 1 shows an exploded view of a first embodiment of a glue-on attachable flywheel weight and a flywheel of a motorcycle engine.

FIG. 1 shows an exploded view of an embodiment of a glue-on attachable flywheel weight 100 (referred to below as a "flywheel weight") and a flywheel 102 of a motorcycle engine 104. The engine may be any suitable type of engine. For example, the engine may be a two-stroke engine. In another example, the engine may be a four-stroke engine. The flywheel may be any suitable shape or design to correspond with the engine type. Typically, the flywheel may be cylindrical in shape and may couple to a crankshaft of the motorcycle engine. For example, the flywheel may be an original equipment merchandise (OEM) ignition flywheel.

The flywheel weight may be a continuous shape of revolution, such as a ring or disk that substantially conforms to a shape of the flywheel. The flywheel weight may be made from metal or a similar material. In one particular example, the flywheel weight may be machined steel.

The flywheel weight may be attached to the flywheel via an adhesive 106. The adhesive may be any suitable adhesive, glue, resin, epoxy, or other suitable material to attach the flywheel weight to the flywheel. In one example, the adhesive may include an epoxy that is oil and heat tolerant. In some embodiments, the adhesive may be applied via injection through one or more holes in the flywheel weight. In one particular example, a 0.006 inch thick layer of epoxy applied to inner interface surfaces of the flywheel weight may be suitable to attach the flywheel weight to the flywheel. It is to be understood that this is merely one example and the clearance and thickness may vary depending on the strength characteristics of the adhesive. For example, a range from 0.005-0.007 inches may be used may be used for the epoxy layer.

Figure 2:
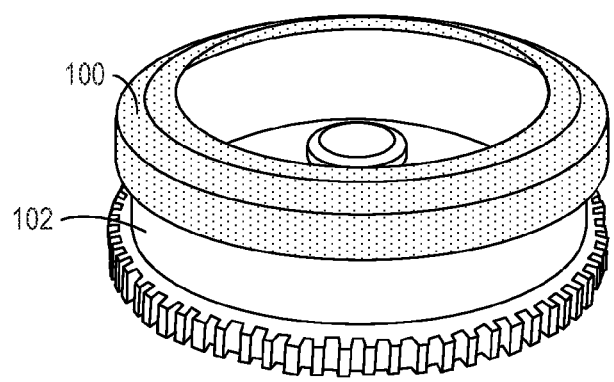
FIG. 2 shows a perspective view of the first embodiment of the glue-on attachable flywheel weight attached to the flywheel of the motorcycle engine of FIG. 1.

FIG. 2 shows a perspective view of the flywheel weight 100 attached to the flywheel 102 of the motorcycle engine of FIG. 1. The flywheel weight may be machined to conform to dimensions of a circumference and/or a face of the flywheel, such that the flywheel weight attaches to a cylindrical or curved face of the flywheel. The flywheel weight may further attach to a face that is perpendicular to the cylindrical face of the flywheel. When attached to the flywheel, the flywheel weight may extend beyond an edge of the flywheel and partially cap the flywheel so that the flywheel weight attaches to two surfaces of the flywheel that are orthogonal. By attaching to two orthogonal surfaces, an attachment strength between the flywheel weight and the flywheel may be increased relative to a configuration with a single attachment surface.

In the illustrated embodiment, the flywheel weight is configured to fit to an outer circumference of the flywheel. However, in some embodiments, the flywheel weight may be configured to fit an inner circumference of the flywheel.

Figure 3:
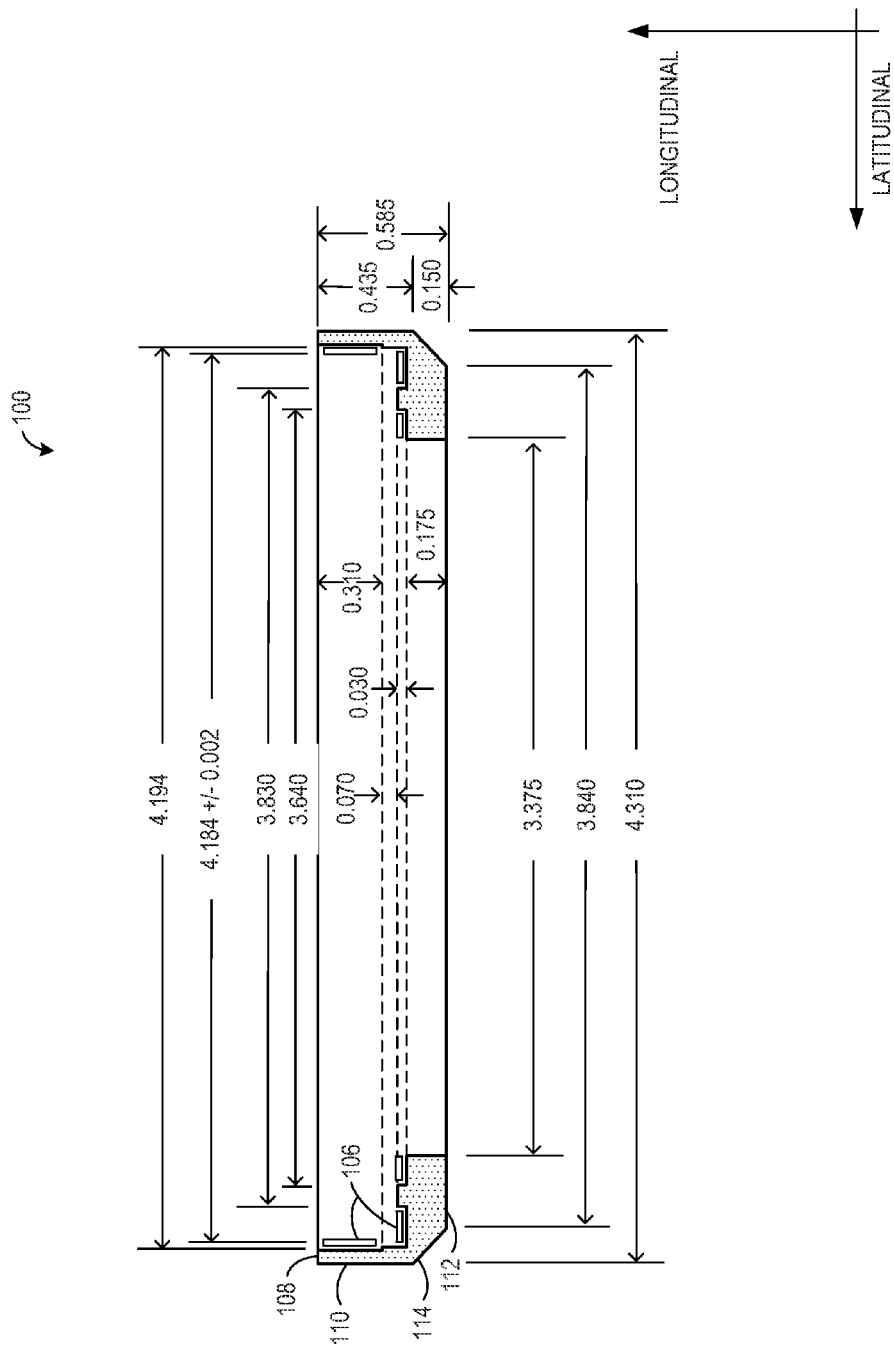
FIG. 3 shows a cross-sectional view of the first embodiment of the glue-on attachable flywheel weight with adhesive applied.

FIG. 3 shows a cross-sectional view of the flywheel weight 100. The flywheel weight 100 has dimensions shown as an example, although it will be appreciated that variations on the depicted dimensions are possible without departing from the scope of the present description. The flywheel weight 100 includes a weight ring or body 108. The body 108 includes a second section 112 elongated in a latitudinal direction, a first section 110 elongated in a longitudinal direction, and a shoulder section 114 that connects the first and second sections at an angle (e.g., a ninety degree angle). In the illustrated embodiment, the second section may be substantially perpendicular to the first section. The shoulder section may be square such that the edges of the first and section sections are orthogonal.

Adhesive 106 is shown applied to an interior of the body. In particular, adhesive is applied to the interior of the second section and adhesive is applied to the interior of the first section so as to contact the flywheel.

In more detail, FIG. 8 shows an expanded cross-sectional portion of the body 108 of the flywheel weight 100. The ring body 108 includes the second section 112 elongated in the latitudinal direction, the first section 110 elongated in the longitudinal direction and the shoulder section 114 that connects the first and second sections at an angle.

The second section further includes an outer second section adhesive channel 116 and an inner second section adhesive channel 118 that are separated by a second section guide structure 120. For example, there may be 0.006 inches of clearance between the second section adhesive channels and the flywheel for suitable adhesion to attach the flywheel weight to the flywheel, although other clearances may be used to obtain suitable adhesion, as discussed above. The second section guide structure 120 directs the flywheel into longitudinal alignment with the flywheel weight, to help ensure that the position of the weight ring is sufficiently deeply mounted on the flywheel for proper adhesive bonding, and to avoid contact with an engine casing. For example, there may be 0.001 inches of clearance between the second section guide structure 120 and the flywheel for proper alignment, although other clearances may be used to obtain proper alignment.

The first section 110 further includes a first section guide structure 122 and a first section adhesive channel 124. For example, there may be 0.006 inches of clearance between the first section adhesive channel 124 and the flywheel for proper adhesion, although other clearances may be used to obtain proper adhesion as discussed above. The first section guide structure 122 directs the flywheel into latitudinal alignment with the flywheel weight, to help ensure the flywheel is centered on the rotational axis of the flywheel. For example, there may be 0.001 inches of clearance between the first section guide structure 122 and the flywheel for proper alignment, although other clearances may used to obtain proper alignment. The first section guide structure 122 may include an interface surface that is curved to fit a cylindrical side surface of the flywheel and the second section guide structure 120 may include an interface surface that is flat to fit an end surface of the flywheel.

The second section guide structure 120 and the first section guide structure 122 may be raised portions, such as ribs or bumps that may form channels for the adhesive. Moreover, the raised portions may provide surface area contact between the flywheel weight and the flywheel when the adhesive is applied in between them. In particular, the raised portions may contact the flywheel and increase friction that helps the flywheel weight maintain a fixed position on the flywheel. These raised portions may keep the flywheel weight centered and in balance on the flywheel, so that the flywheel weight does not float on the adhesive.

It is to be understood that the shape of the first embodiment of the flywheel weight may be machined to fit a specific flywheel (e.g., flywheel 102). In the illustrated embodiment, a thickness of the first section 110 is narrower with respect to the second section 112. The first section 110 is comprised of the rectangular first section guide structure 122 and first section adhesive channel 124. The first section guide structure 122 elongates along a segment of the first section 110 in the longitudinal direction beginning at the shoulder section 114. The first section guide structure 122 ends at a right angle along the segment of the first section 110 wherein the first section adhesive channel 124 continues along the remainder of the first section 110 to the end of the first section 110.

Similarly, the second section 112 is comprised of the rectangular second section guide structure 120 and second section adhesive channels 116 and 118. The second section guide structure 120 elongates along a central segment of the second section 112. The second section guide structure 120 may be positioned substantially in the middle of the second section 112. The shoulder section 114 connects the second section 112 and the first section 110 to form a diagonal exterior surface between the first and second sections that may be beveled. Furthermore, a thickness of the first section 110 may be substantially thinner than a thickness the second section 112.

The flywheel weight 100 may contact two surfaces of a flywheel to attach the flywheel weight to the flywheel. The attachment surfaces of the flywheel may be orthogonal. In particular, the first section guide structure 122 may contact the cylindrical side of the flywheel. As such, a contact surface of the first section guide structure may be curved to fit the shape of the flywheel cylinder. Furthermore, the second section guide structure 120 may contact an end surface of the flywheel. As such, a contact surface of the second section guide structure may be substantially flat.

Figure 4:
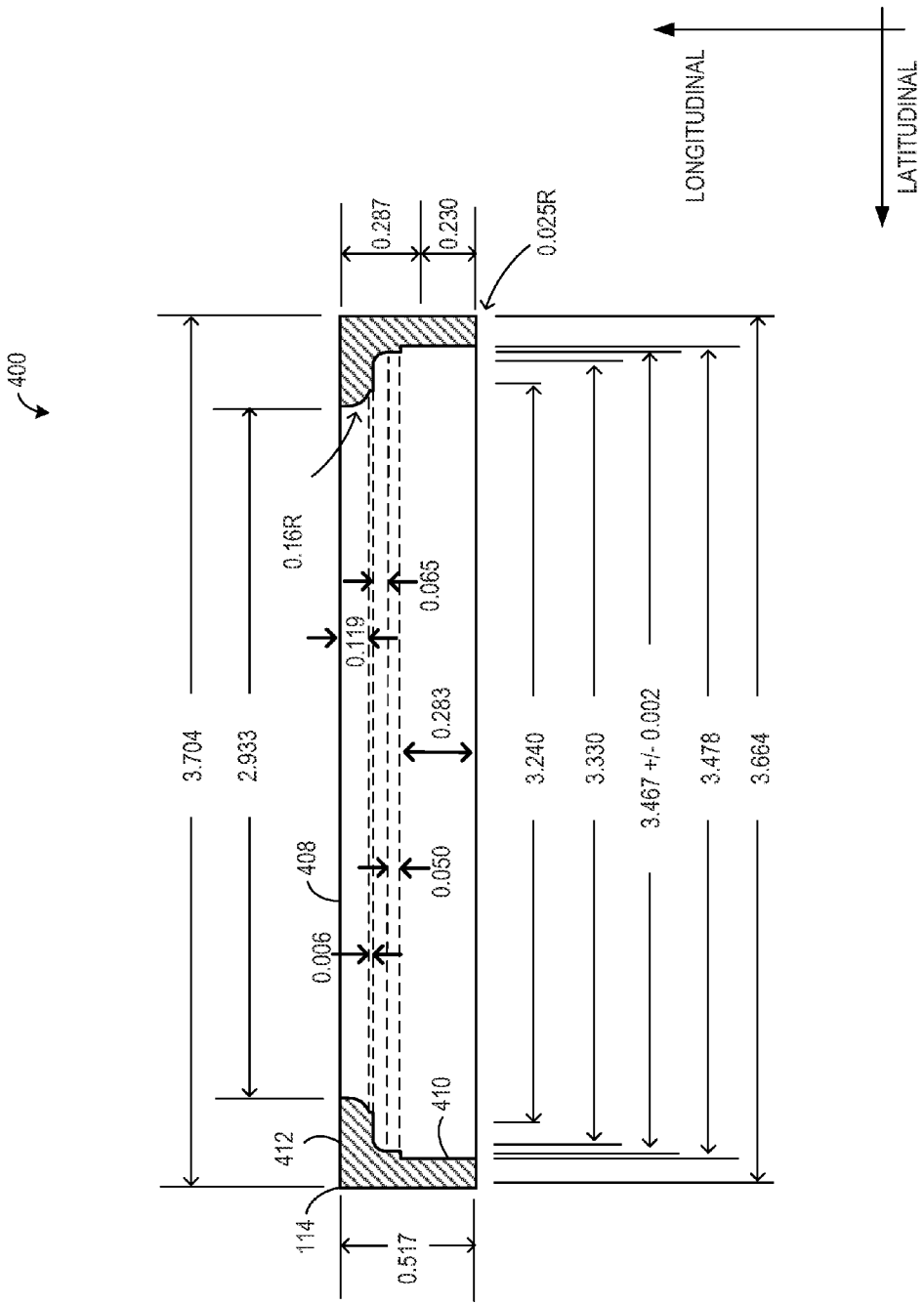
FIG. 4 shows a cross-sectional view of a second embodiment of the glue-on attachable flywheel weight.

FIGS. 4 and 9 show a second embodiment of a glue-on attachable flywheel weight 400. The flywheel weight 400 is machined to fit a specific flywheel that differs from the flywheel referred to with respect to the first embodiment. In particular, the flywheel weight 400 may be configured to attach to a flywheel having a rounded edge or attachment interface, whereas the flywheel weight 100 may be configured to attach to a flywheel having a straight edge or orthogonal attachment interface. Like the flywheel weight 100, the flywheel weight 400 is configured to attach to an exterior cylindrical side surface and an end surface of a flywheel.

In FIG. 4, the flywheel weight 400 has dimensions shown as an example, although it will be appreciated that variations on the depicted dimensions are possible without departing from the scope of the present description. The ring body 408 includes the second section 412 elongated in the latitudinal direction, the first section 410 elongated in the longitudinal direction and the shoulder section 414 that connects the first and second sections at an angle. In the second embodiment, the first section 410 is comprised of a rectangular first section guide structure 422 and a first section adhesive channel 424. The first section guide structure 422 elongates along a segment of the first section 410 in the longitudinal direction beginning at the shoulder section 414. For example, the first section guide structure 422 ends at a right angle along the segment of the first section 410 wherein the first section adhesive channel 424 continues along the remainder of the first section 410 to the end of the first section 410. The second section 412 is comprised of a continuous rectangular second section guide structure 420 portion and a second section adhesive channel 416 that arches away from the second section guide structure 420.

Similar to the first section guide structure 422, the second section guide structure 420 elongates along a segment of the second section 412 in the latitudinal direction beginning at the shoulder section 414 and ending at a right angle at a middle segment of the second section 412. At a middle segment of the second section 412, the second section adhesive channel 416 contours away from the second section guide structure 420 to form an arc that connects the second section guide structure 420 to an exterior surface of the second section 412. In some cases, the arc of the second section adhesive channel 416 may match a contour of the corresponding flywheel. For example, the flywheel may include rounded portions that match the shoulder section 414 and the second section adhesive channel 416. Moreover, the flywheel may extend to or beyond an exterior edge of the second section adhesive channel 416 such that the flywheel may extend beyond the body 408 in the longitudinal direction. In some cases, the arc may provide additional space to form a thicker layer of adhesive. An exterior portion of the shoulder section 414 joins the second section 412 and the first section 410 at a right angle. An interior portion of the shoulder section 414 joins the second section 412 and the first section 410 via an arc that is contoured to fit a rounded edge of the corresponding flywheel to which the flywheel weight 400 is configured to attach. In other words, the shoulder section may be rounded. The second section 412 and the first section 410 may be perpendicular to each other. Furthermore, a thickness of the first section 410 may be slightly thinner than a thickness of the second section 412.

The flywheel weight 400 may contact two surfaces of a flywheel to attach the flywheel weight to the flywheel. The attachment surfaces of the flywheel may be rounded. In particular, the first section guide structure 422 may contact the cylindrical side of the flywheel. As such, an interface surface of the first section guide structure may be curved to fit the shape of the flywheel cylinder. Furthermore, the second section guide structure 420 may contact a flat end surface of the flywheel. As such, an interface surface of the second section guide structure may be substantially flat.

Figure 5:
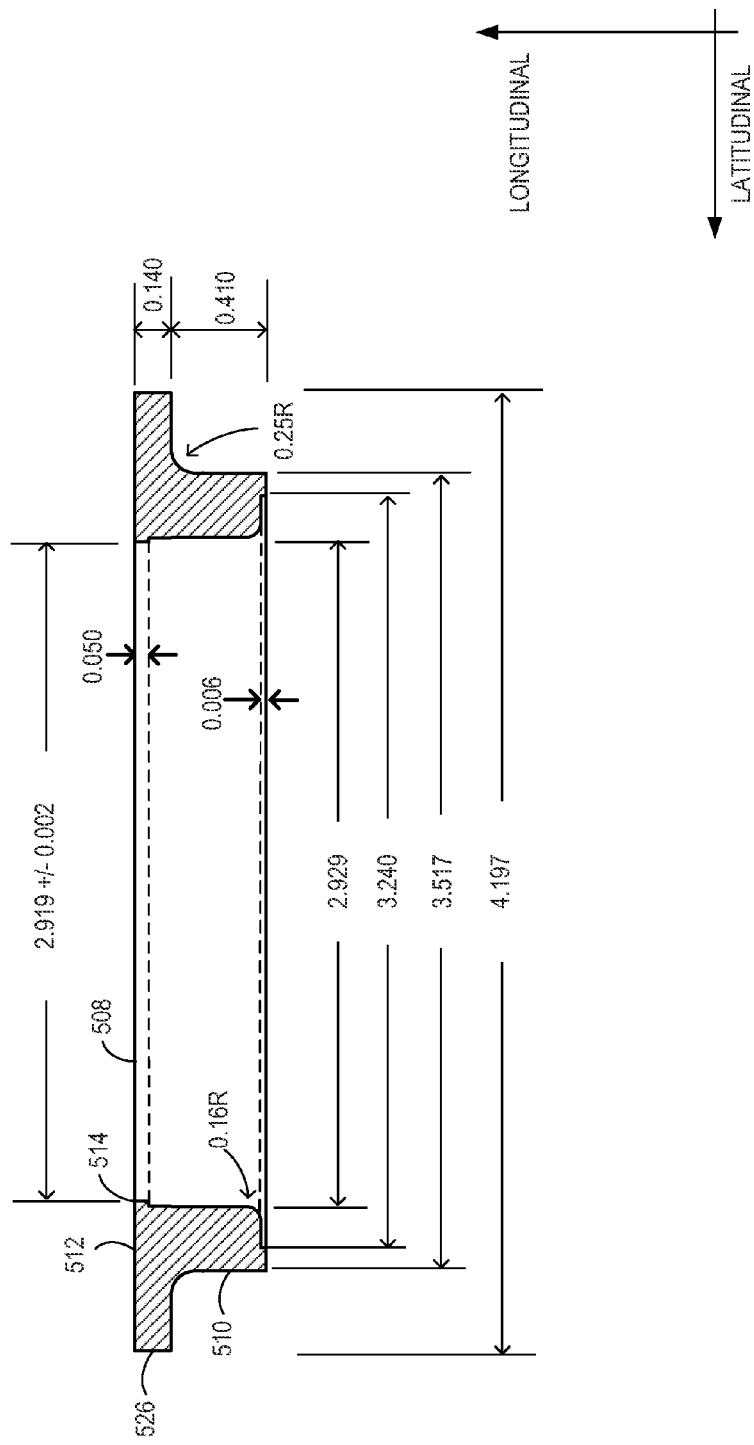
FIG. 5 shows a cross-sectional view of a third embodiment of the glue-on attachable flywheel weight.

FIGS. 5 and 10 show a third embodiment of a glue-on attachable flywheel weight 500. The flywheel weight 500 is machined to fit a specific flywheel that differs from the flywheels referred to with respect to the first embodiment and the second embodiment. In particular, the flywheel weight 500 may be configured to attach to a rounded attachment surface that mirrors an attachment surface of the flywheel to which the flywheel weight 400 attaches. Moreover, the flywheel weight 500 may include a flange portion that extends in the latitudinal direction. The flange portion may extend beyond an exterior surface of the first section away from the cylindrical side surface of the flywheel. In some cases, the flange portion shifts a moment of inertia of the flywheel.

In FIG. 5, the flywheel weight 500 has dimensions shown as an example, although it will be appreciated that variations on the depicted dimensions are possible without departing from the scope of the present description. The ring body 508 includes the second section 512 elongated in the latitudinal direction, the first section 510 elongated in the longitudinal direction and the shoulder section 514 that connects the first and second sections at an angle. In the third embodiment, the first section 510 is comprised of a rectangular first section guide structure 522 portion and a first section adhesive channel 524 that continues uninterrupted to the second section adhesive channel 516. The first section guide structure 522 elongates along a segment of the first section 510 and produces the shoulder section 514. The first section adhesive channel 524 begins at the shoulder section 514 and contours continuously into the second section adhesive channel 516 to form an arc between the first section adhesive channel 524 and the second section adhesive channel 516. The arc collectively formed by the first section adhesive channel 524 and the second section adhesive channel 516 may contour to an arc formed in an attachment surface of the flywheel. The first section adhesive channel 524 may be perpendicular to the second section adhesive channel 516.

The second section adhesive channel 516 meets the rectangular second section guide structure 520 along the second section 512. Extending in the latitudinal direction, and as part of the second section 512, is an additional rectangular flange portion 526 that provides supplementary weight to the flywheel weight 500. The flange portion 526 may extend beyond an exterior surface of the first section 510, away from a cylindrical side surface of the flywheel. Moreover, the flange portion 526 may shifts a moment of inertia of the flywheel when the flywheel weight 500 is attached to the flywheel. The flange portion 526 connects the first section 510 with the second section 512 via an arc of an exterior surface of the shoulder section 514. In other words, the exterior surface of the shoulder section may be rounded. Furthermore, a thickness of the first section 510 may be slightly thicker than a thickness of the second section 512 and/or the flange portion 526.

The flywheel weight 500 may contact two surfaces of a flywheel to attach the flywheel weight to the flywheel. The attachment surfaces of the flywheel may be rounded. In particular, the first section guide structure 522 may contact the cylindrical side of the flywheel. As such, an interface surface of the first section guide structure may be curved to fit the shape of the flywheel cylinder. Furthermore, the second section guide structure 520 may contact a flat surface of the flywheel. As such, an interface surface of the second section guide structure may be substantially flat.

Figure 6:
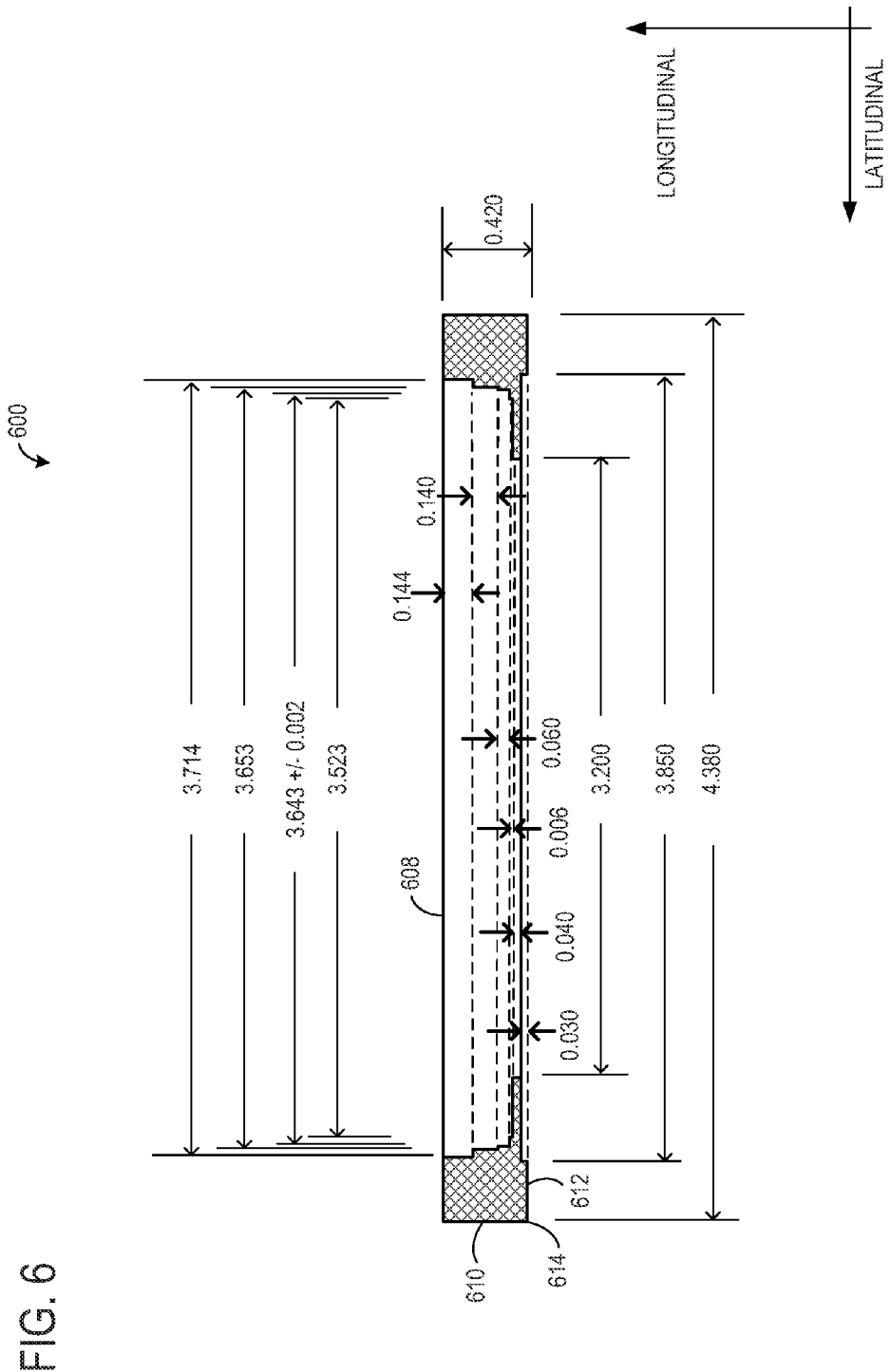
FIG. 6 shows a cross-sectional view of a fourth embodiment of the glue-on attachable flywheel weight.

FIGS. 6 and 11 show a fourth embodiment of a glue-on attachable flywheel weight 600. The flywheel weight is machined to fit a specific flywheel that differs from the flywheels referred to with respect to the first embodiment, the second embodiment, and the third embodiment. In particular, the flywheel weight 600 may be configured to attach to flat attachment surfaces of the flywheel. Moreover, the flywheel weight 600 may include a second section having a thickness that is substantially thinner that a thickness of a first section.

In FIG. 6, the flywheel weight 600 has dimensions shown as an example, although it will be appreciated that variations on the depicted dimensions are possible without departing from the scope of the present description. The ring body 608 includes the second section 612 elongated in the latitudinal direction, the first section 610 elongated in the longitudinal direction and the shoulder section 614 that connects the first and second sections at an angle. In the fourth embodiment, the first section 610 is comprised of a rectangular first section guide structure 622 and a first section adhesive channel 624. The first section guide structure 622 elongates along a segment of the first section 610 in the longitudinal direction beginning at the shoulder section 614. The first section guide structure 622 ends at a right angle along the segment of the first section 610 wherein the first section adhesive channel 624 continues along another segment of the first section 610. The first section adhesive channel 624 ends at a right angle about two-thirds the length of the first section 610 wherein a rectangular space continues along the remainder of the first section 610 to the end of the first section 610.

Similarly, the second section 612 is comprised of a rectangular second section guide structure 620 and a second section adhesive channel 616. The second section guide structure 620 elongates along a segment of the second section 612 in the latitudinal direction beginning at the shoulder section 614. The shoulder section may be square such that the edges of the longitudinal and latitudinal section are orthogonal. The second section guide structure 620 ends at a right angle along the segment of the second section 612 wherein the second section adhesive channel 616 continues along the second section 612 until the end of the second section 612. Furthermore, the fourth embodiment includes a rectangular channel on the second section 612 opposite the second section adhesive channel 616 and the second section guide structure 620. Furthermore, a thickness of the first section 610 may be substantially thicker than a thickness of the second section 612.

The flywheel weight 600 may contact two surfaces of a flywheel to attach the flywheel weight to the flywheel. In particular, the first section guide structure 622 may contact a cylindrical side of the flywheel. As such, an interface surface of the first section guide structure may be curved to fit the shape of the flywheel cylinder. Furthermore, the second section guide structure 620 may contact a flat end surface of the flywheel. As such, an interface surface of the second section guide structure may be substantially flat.

Figure 7:
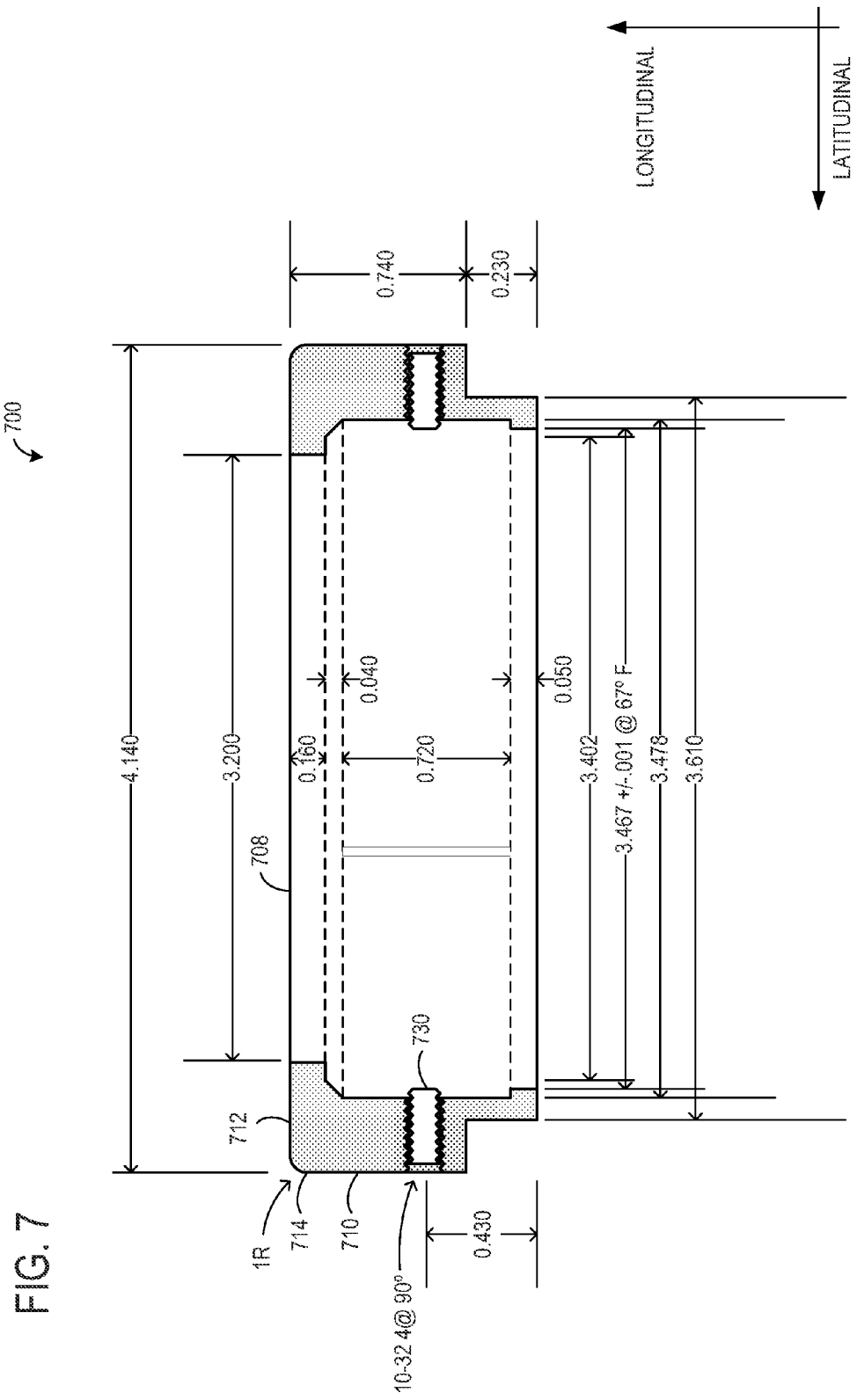
FIG. 7 shows a cross-sectional view of a fifth embodiment of the glue-on attachable flywheel weight.

FIGS. 7 and 12 show a fifth embodiment of a glue-on attachable flywheel weight 700. The flywheel weight 700 is machined to fit a specific flywheel that differs from the flywheel referred to with respect to the first, second, third, and fourth embodiments. In particular, the flywheel weight 700 may be configured to attach to a flywheel via adhesive injection holes and supplemental set screws. The flywheel weight 700 is configured to attach to an exterior cylindrical side surface and an end surface of a flywheel. Moreover, the flywheel weight 700 may include a second section having a thickness that is substantially thinner that a thickness of a first section.

In FIG. 7, the flywheel weight 700 has dimensions shown as an example, although it will be appreciated that variations on the depicted dimensions are possible without departing from the scope of the present description. The ring body 708 includes the second section 712 elongated in the latitudinal direction, the first section 710 elongated in the longitudinal direction and the shoulder section 714 that connects the first and second sections at an angle. In the fifth embodiment, a first section 710 is comprised of a rectangular first section guide structure 722 and a first section adhesive channel 724. The first section adhesive channel 724 elongates along a segment of the first section 710 in the longitudinal direction beginning at the shoulder section 714. For example, the first section adhesive channel 724 ends at a right angle along the segment of the first section 710 wherein the first section guide structure 722 continues along the remainder of the first section 710 to the end of the first section 710.

The second section 712 is comprised of a rectangular second section guide structure 720. The second section guide structure 720 elongates along a segment of the second section 712 in the latitudinal direction beginning at the shoulder section 714. In this embodiment, a second section adhesive channel is omitted. An interior portion of the shoulder section 714 joins the second section 712 and the first section 710 via a bevel or angle that is contoured to fit a beveled edge of the corresponding flywheel to which the flywheel weight 700 is configured to attach. In other words, the shoulder section may be beveled. The second section 712 and the first section 710 may be perpendicular to each other.

The flywheel weight 700 may contact two surfaces of a flywheel to attach the flywheel weight to the flywheel. The attachment surfaces of the flywheel may be rounded. In particular, the first section guide structure 722 may contact the cylindrical side of the flywheel. As such, an interface surface of the first section guide structure may be curved to fit the shape of the flywheel cylinder. Furthermore, the second section guide structure 720 may contact a flat end surface of the flywheel. As such, an interface surface of the second section guide structure may be substantially flat.

The flywheel weight 700 may include adhesive injection holes 726 that are formed in the first section 710. The adhesive injection holes 726 may be oriented perpendicular to the first section and may extend entirely through the ring body 708. The adhesive injection holes 726 may include threads 728 to receive set screws that may provide additional friction/clamping strength to the flywheel weight. For example, the flywheel weight may include four adhesive injection holes that are offset by ninety degrees around the circumference of the body 708.

When attaching the flywheel weight 700 to a flywheel adhesive may be injected to the adhesive injection holes into the adhesive channel 724. Set screws 730 can be used to plug and unplug the adhesive injection holes to get the injected adhesive to fill all of the adhesive channels of the flywheel weight. The set screws 730 may hold the flywheel weight in place on the flywheel while the adhesive is injected and sets up. When the set screws are tightened down so that they protrude through the adhesive injection holes and contact the flywheel, the set screws may provide additional friction/clamping strength to attach the flywheel weight to the flywheel. The set screws may become permanently attached when the adhesive hardens, such that the set screws do not require re-tightening over time. The set screws may be employed in configurations where the flywheel weight is larger/heavier, such that the adhesive alone may not provide suitable attachment strength.

Figure 13:
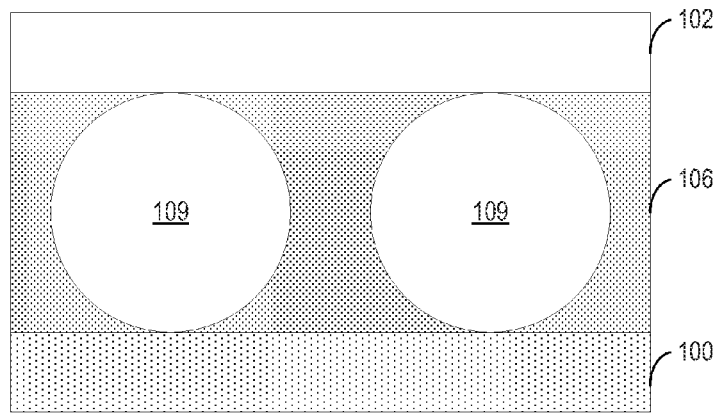
FIG. 13 shows a cross-sectional view of an embodiment of an adhesive including friction balls that attaches a flywheel weight to a flywheel.

In some embodiments, the flywheel weight may be attached to the flywheel with adhesive that includes friction balls that may increase friction between the flywheel weight and the flywheel in order to keep the flywheel weight centered and in balance on the flywheel. In particular, the friction balls may increase a contact surface area that is not covered by adhesive. FIG. 13 shows an embodiment of the adhesive 106 that includes friction balls 109. The adhesive 106 may be applied in a layer between the flywheel weight 100 and the flywheel 102. For example, the friction balls 109 may be sized to fit the thickness of the adhesive layer. In one particular example, the friction balls may have a 0.005-inch diameter. In some embodiments, the friction balls may be sized slightly larger than the adhesive layer and may be compressed when the flywheel weight is attached to the flywheel to further increase the contact surface area.

The friction balls may comprise any suitable material. For example, the friction balls may be made from silica or some other heat resistant material. Although the friction balls are depicted as being round in the illustrated embodiment, it will be appreciated that the friction balls may take any suitable shape.

In some embodiments, the friction balls may be mixed into the adhesive and used instead of the raised portions/adhesive guide structures on the inner circumference of the flywheel weight, and the raised portions may be omitted from the flywheel weight such that the surfaces of the first and second sections are smooth. The channel guides and friction balls, alone or in combination, may prevent the flywheel weight from floating on the adhesive and moving off center and putting the flywheel out of balance when the flywheel weight is attached to the flywheel. The move off-center may cause the thickness of the adhesive to vary from the thickness needed for suitable strength for adherence. Accordingly, by keeping the flywheel weight centered on the flywheel a possibility of a reduction in strength of the attachment between the flywheel weight and the flywheel may be reduced.

Figure 14:
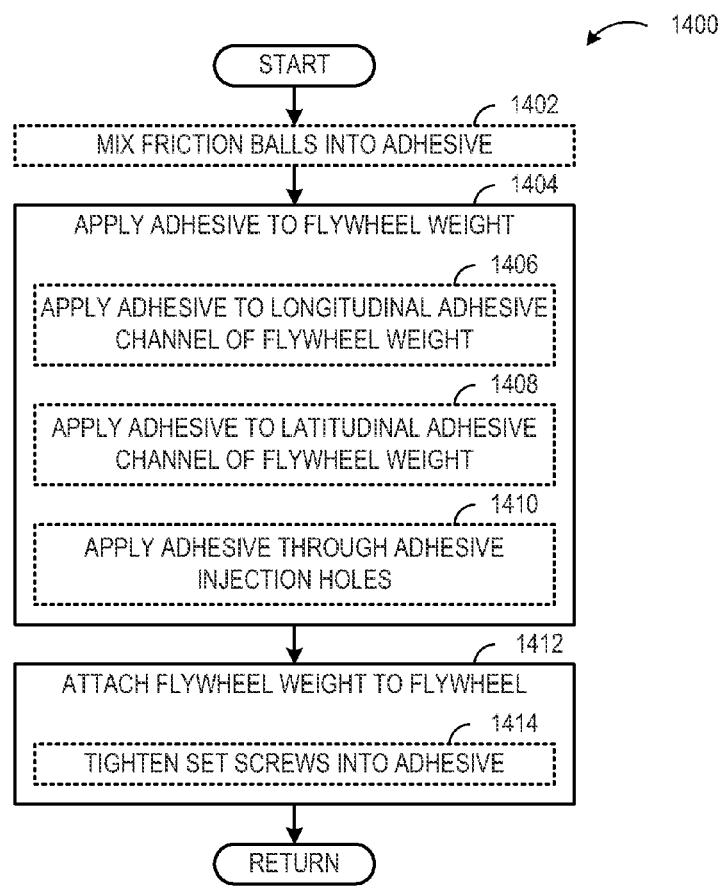
FIG. 14 shows an embodiment of a method for adding rotational mass to an engine flywheel.

FIG. 14 shows an embodiment of a method 1400 for adding rotational mass to an engine flywheel. At 1402, the method 1400 may optionally include mixing friction balls into adhesive. The friction balls may be mixed into the adhesive in any suitable manner. For example, the friction balls may be mixed with the adhesive until they are substantially evenly distributed throughout the adhesive. The friction balls may be applied to the adhesive prior to applying the adhesive to the flywheel weight. The friction balls may displace the adhesive and increase a contact surface area between the flywheel and the flywheel weight in order to increase the likelihood of the flywheel weight being centered and balanced on the flywheel when attached to the flywheel. In some embodiments, the friction balls may be used in place of adhesive guide structures or raised portions, and such structures may be omitted from the flywheel weight.

At 1404, the method 1400 may include applying adhesive to the flywheel weight. In one example, the adhesive may be applied to the flywheel weight in a 0.006 inch thick layer.

In some embodiments, the flywheel weight may include a first section adhesive channel. At 1406, the method 1400 may optionally include applying adhesive to the first section adhesive channel of the flywheel weight.

In some embodiments, the flywheel weight may include a latitudinal adhesive channel. At 1408, the method 1400 may optionally include applying adhesive to the latitudinal adhesive channel of the flywheel weight.

In some embodiments, the flywheel weight may include adhesive injection holes. At 1410, the method 1400 may optionally include applying adhesive through the adhesive injection holes to the adhesive channels. In some embodiments, the adhesive injection holes may be plugged with set screws to hold the flywheel weight in place on the flywheel while the adhesive is being applied. As such, the set screws may be removed one at a time to expose the corresponding adhesive injection hole in order to apply the adhesive to that hole.

At 1412, the method 1400 may include attaching the flywheel weight to the flywheel. For example, the flywheel weight may be attached to the flywheel such that a first section attaches to a cylindrical side surface of the flywheel and the latitudinal section attaches to an end surface of the flywheel that is perpendicular to the cylindrical side surface. Further, the second section guide structure may direct the flywheel into longitudinal alignment with the flywheel weight, such that a position of the flywheel weight ring is sufficiently deeply mounted on the flywheel for proper adhesive bonding, and to avoid contact with an engine casing.

In some embodiments, the flywheel weight may include adhesive injection holes and set screws. At 1414, the method 1400 may optionally include tightening the set screws into the adhesive injection holes to provide additional friction/clamping strength.

The above described method may provide an inexpensive solution for an amateur mechanic to increase a rotational inertia of a flywheel of a motorcycle. Moreover, by attaching a flywheel weight to the flywheel with adhesive (and set screws in some cases), repeated maintenance (e.g., tightening fasteners) to keep a flywheel weight attached to a flywheel may be eliminated.

It is to be understood that references to "latitude" and "longitude" are relative to a position of the flywheel weight and not relative to geographic coordinates. Furthermore, the longitudinal axis corresponds to a rotational axis of the flywheel, and the latitudinal axis is orthogonal to the longitudinal axis of the flywheel.

Although in many of the above described embodiments adhesive is described as being added to both the first section and second section adhesive channels, it will be appreciated that in some embodiments adhesive may be filled into only one channel and not the other of the first section and second section adhesive channels, even when both channels are provided. Further, in other embodiments only one of the first section and second section adhesive channels may be provided, and filled with adhesive.

The embodiments disclosed herein are presented in view of the present invention. Other embodiments, forms, modes and applications are achievable while remaining within the scope of the description. Finally, it will be understood that the articles and methods described herein are exemplary in nature, and that these specific embodiments or examples are not to be considered in a limiting sense, because numerous variations are contemplated. Accordingly, the present disclosure includes all novel and non-obvious combinations and sub-combinations of the various articles and methods disclosed herein, as well as any and all equivalents thereof.

The invention claimed is:

1. A glue-on attachable flywheel weight, comprising:
    a body having a continuous shape of revolution, the body including a first section and a second section that is perpendicular to the first section;
    wherein the first section comprises a first section guide structure and a first section adhesive channel around a periphery of the body facing an exterior cylindrical side surface of the flywheel,
    wherein the first section adhesive channel is configured to be filled with adhesive including one or more of resin and epoxy providing adhesive bonding between the first section and the flywheel when the flywheel weight is attached to the flywheel,
    wherein the first section guide structure comprises a first section interface surface configured to interface with the exterior cylindrical side surface of the flywheel when the flywheel weight is attached to the flywheel,
    wherein the second section comprises a second section guide structure and two second section adhesive channels, the two second section adhesive channels facing an end surface of the flywheel,
    wherein the two second section adhesive channels are configured to be filled with adhesive including one or more of resin and epoxy providing adhesive bonding between the second section and the flywheel when the flywheel weight is attached to the flywheel,
    wherein the second section guide structure comprises a second section interface surface configured to interface with the end surface of the flywheel when the flywheel weight is attached to the flywheel,
    wherein the first section interface surface is perpendicular to the second section interface surface, and the first section interface surface and the first section adhesive channel at least partially circumscribe a circumference of the body,
    wherein the first section guide structure and the second section guide structure are weighted to keep the center of mass of the flywheel weight centered,
    wherein the second section guide structure directs the flywheel into longitudinal alignment with the flywheel weight,
    wherein the first section guide structure directs the flywheel into latitudinal alignment with the flywheel weight, and
    wherein the adhesive includes friction balls that contact the flywheel and the flywheel weight when the flywheel weight is attached to the flywheel.

2. The glue-on attachable flywheel weight of claim 1, wherein the first section interface surface of the first section guide structure is curved, and wherein the second section interface surface of the second section guide structure is flat.

3. The glue-on attachable flywheel weight of claim 1, wherein a thickness of the first section is less than a thickness of the second section.

4. The glue-on attachable flywheel weight of claim 1, wherein the first section interface surface and the second section interface surface are substantially smooth.

5. The glue-on attachable flywheel weight of claim 1, wherein the body includes a right-angled shoulder section that connects the first section and the second section.

6. A method for adding rotational mass to an engine flywheel, the method comprising:
    applying an adhesive to a flywheel weight having a continuous shape of revolution, the flywheel weight including a first section and a second section that is perpendicular to the first section; and
    attaching the flywheel weight with the applied adhesive to a flywheel;
    wherein the first section comprises a first section guide structure and a first section adhesive channel around a periphery of the flywheel weight facing an exterior cylindrical side surface of the flywheel,
    wherein the first section adhesive channel is filled with adhesive including one or more of resin and epoxy providing adhesive bonding between the first section and the flywheel when the flywheel weight is attached to the flywheel,
    wherein the first section guide structure comprises a first section interface surface configured to interface with the exterior cylindrical side surface of the flywheel when the flywheel weight is attached to the flywheel,
    wherein the second section comprises a second section guide structure and two second section adhesive channels, the two second section adhesive channels facing an end surface of the flywheel,
    wherein the two second section adhesive channels are configured to be filled with adhesive including one or more of resin and epoxy providing adhesive bonding between the second section and the flywheel when the flywheel weight is attached to the flywheel,
    wherein the second section guide structure comprises a second section interface surface configured to interface with the end surface of the flywheel when the flywheel weight is attached to the flywheel, and
    wherein the first section interface surface is perpendicular to the second section interface surface, and the first section interface surface and the first section adhesive channel at least partially circumscribe a circumference of the body, and
    wherein the first section guide structure and the second section guide structure are weighted to keep the center of mass of the flywheel weight centered,
    wherein the second section guide structure directs the flywheel into longitudinal alignment with the flywheel weight,
    wherein the first section guide structure directs the flywheel into latitudinal alignment with the flywheel weight, and
    wherein the adhesive includes friction balls that contact the flywheel and the flywheel weight when the flywheel weight is attached to the flywheel.

7. The method of claim 6, wherein the first section interface surface and the second section interface surface are smooth.

8. The method of claim 6, wherein the first section interface surface of the first section guide structure is curved, and wherein the second section interface surface of the second section adhesive structure is flat.

9. The method of claim 6, wherein the adhesive is an epoxy.

* * * * *